United States Patent [19]
Hussey

[11] Patent Number: 6,053,191
[45] Date of Patent: Apr. 25, 2000

[54] MUD-SAVER VALVE

[76] Inventor: James J. Hussey, 438 W. Gaywood, Houston, Tex. 77079

[21] Appl. No.: 08/799,711

[22] Filed: Feb. 13, 1997

[51] Int. Cl.[7] .............................. F16K 7/07; F16K 31/126
[52] U.S. Cl. ..................................... 137/2; 137/15; 251/5; 251/61.1; 175/218; 175/317
[58] Field of Search ................... 175/218, 317; 251/5, 61.1; 137/15, 315, 2

[56] References Cited

U.S. PATENT DOCUMENTS

| | | |
|---|---|---|
| 2,859,013 | 11/1958 | Peterson ........................................ 251/5 |
| 2,898,088 | 8/1959 | Alder ............................................ 251/5 |
| 3,060,966 | 10/1962 | Ratelband ..................................... 251/5 |
| 3,322,215 | 5/1967 | Warrington .............................. 175/317 |
| 3,354,970 | 11/1967 | Lummus ....................................... 251/5 |
| 3,365,009 | 1/1968 | Burnham et al. ............................. 251/5 |
| 3,376,935 | 4/1968 | Baker ...................................... 166/224 |
| 3,646,607 | 2/1972 | Dower .......................................... 251/5 |
| 3,703,213 | 11/1972 | Kammerer, Jr. et al. .................... 251/5 |
| 3,965,980 | 6/1976 | Williamson .............................. 137/496 |
| 3,970,144 | 7/1976 | Boykin, Jr. ................................... 251/5 |
| 4,245,672 | 1/1981 | Schott Malo et al. ....................... 251/5 |
| 4,303,100 | 12/1981 | Kalb ............................................. 251/5 |
| 4,625,755 | 12/1986 | Reddoch ................................. 137/327 |
| 4,779,688 | 10/1988 | Baugh ..................................... 175/218 |
| 4,811,758 | 3/1989 | Piper ............................................ 251/5 |
| 4,962,819 | 10/1990 | Bailey et al. ............................ 175/218 |
| 5,137,090 | 8/1992 | Hare et al. ............................... 166/325 |
| 5,165,493 | 11/1992 | Baugh ..................................... 175/218 |
| 5,205,325 | 4/1993 | Piper ....................................... 175/317 |
| 5,253,704 | 10/1993 | Barrus et al. ................................ 251/5 |
| 5,339,864 | 8/1994 | Carbaugh et al. ........................... 251/5 |
| 5,364,064 | 11/1994 | Carlson et al. .............................. 251/5 |

*Primary Examiner*—George L. Walton
*Attorney, Agent, or Firm*—Felsman, Bradley, Vaden, Gunter & Dillon, LLP

[57] ABSTRACT

A mud saver valve adapted to be connected below a kelly including an elastomeric sleeve that opens and closes within a housing, the sleeve defining a flow passage within it and closing against a barrier located within the flow passage, the sleeve closing against the core at low positive differential pressures.

12 Claims, 9 Drawing Sheets

MUD-SAVER VALVE

BACKGROUND OF INVENTION

Field of Invention

This invention relates to a sleeve valve for industrial fluid flow control applications requiring a high opening pressure to open, and in particular relates to a "mud saver valve" to be attached to a kelly.

BACKGROUND OF THE INVENTION

In drilling for oil and gas with jointed pipe, as the drilling progresses joints must be added to the string already in the well. The kelly, used for rotating the pipe, attaches to the top joint of the pipe in the string.

The kelly is of the approximate length of a joint of pipe itself and rotates the string by virtue of having flattened exterior side surfaces, such as square or hexagonal sides. The flattened surfaces can be gripped and rotated by a rotary table located on the floor of the rig as the kelly passes through the rotary table. Alternately, the kelly may be rotated from above by a power swivel.

The kelly must be disconnected from the drill pipe to add a joint. When disconnected, the head of drilling fluid or "mud" contained in the kelly (approximately 60 feet of nominally three inch ID pipe), absent some means to prevent such, will spill out onto the drill rig floor. This creates a safety hazard; it creates an environmental problem if the drilling fluid is not collected in a pan under the drill floor; and finally, it creates the additional cost of the loss of the expensive drilling fluid.

There have been various versions of a kelly stop valve proposed, sometimes called a "mud saver" valve. These designs, however, have incurred either the disadvantage of complexity, such as with check valves, or the disadvantage of control by loaded pressure, either air or nitrogen, in valves using a tube diaphragm or bladder. Experience has shown that prior design tube diaphragms, or bladders, tend to leak. The general overall performance of such designs has been unsatisfactory over time.

Some of the prior designs, moreover, are not adaptable to running wireline through the valve. Such capability is part of the present design. of sleeve diaphragm type mud saver valves uncovered in a preliminary patentability search, only one patent mentions the possibility of sealing the sleeve against an interior core. That patent, U.S. Pat. No. 3,703,213 to Kammerer/Baker, points out that if desired, a central stem could be provided within the bladder. However, the '213 patent positively recites that the bladder seals against the central stem when the bladder is forced inwardly by compressed air. As with other sleeve diaphragm valves uncovered by the search, the valve is not a high opening pressure valve. The bladder or sleeve does not shift to its closed position until air pressure on the outside of the bladder exceeds the pressure of the fluid (e.g. the hydrostatic head) within the bladder. When the fluid pressure within the kelly exceeds the air pressure, this initial positive differential pressure expands the bladder outwardly and fluid flows through the bladder. In contrast, having a high opening pressure valve with a sleeve structured to remain closed against maximum anticipated hydrostatic head pressure from drilling fluid in the kelly obviates the need for the provision of any external hydraulic or pneumatic pressure to close the valve. Furthermore, the '213 design makes no provision for the central stem to be removable or releasably attachable.

It may happen that a drill stem becomes stuck after a kelly has largely passed through the rotary table. Since a mud saver valve attaches at or just below the kelly, at such point the mud saver valve may be in the well bore and inaccessible to surface personnel. Any fishing or wireline work that is desired to be performed at such point must be performed through the mud saver valve. For such reason, the diaphragm sleeve valve of the instant design preferably provides for a sleeve closing around a removable central core and provides for the easy removal of the core for fishing maneuvers.

SUMMARY OF THE INVENTION

The term "low positive differential pressure" is used herein to indicate a level of fluid pressure against the interior surface of a sleeve that exceeds opposing fluid pressure against the exterior surface of the sleeve by less than 100 psi. Absent a resistance to flecture by the material and structure of the sleeve, even a low positive differential pressure would cause an elastomeric sleeve to tend to expand outward.

The present invention comprises an industrial scale fluid flow control valve of tube diaphragm (sleeve) design that requires a high positive differential inlet pressure to open the valve. Such valve has been adapted to be attached at or below the kelly, to be sufficiently short to be included in the string and to pass through a rotary table. The valve is designed to open only at positive differential pressure above a maximum anticipated head pressure of mud in a kelly, sometimes referred to as a high opening pressure valve. The opening pressure may be in the order of 150 to 200 psi.

Conventional tube diaphragm valves utilize an external pressure applied to a chamber created between the housing and the exterior of the elastomeric sleeve to close the sleeve against any positive differential pressure inside. No such external opposing pressure, however, is required to close the valve of the present design. The present design utilizes a sleeve itself formed and structured to seal against an interior core under balanced and "low" differential pressure. Only upon the presence of a "high" inlet pressure, creating a high positive (interior to exterior) differential pressure significantly greater than mud head pressures anticipated in the kelly, does the sleeve expand and open.

Preferably, the core is removable, or is a releaseably attachable core, to facilitate running a wire line tool upon occasion through the valve. Any fluid accumulating between the outside of the sleeve and the housing may be controlled by a vent and possibly also a check valve.

The elastomeric sleeve of the instant design is structured by virtue of its material and shape to require at least several atmospheres of interior inlet pressure before the sleeve will expand away from its sealing contact position with a core within it. The bias against opening is the result of structural design and the physical properties of the tube diaphragm material. The closing force need not be supplied by hydraulic or pneumatic pressure exterior to the elastomeric sleeve, but is supplied by the sleeve bias itself.

Since with the instant design some fluid, either liquid or gas, may possibly leak into portions of the housing behind the sleeve, preferably ports and vents are provided, possibly controlled by check valves, to facilitate the expulsion of such fluid upon the opening of the valve.

DETAILED DESCRIPTION OF PREFERRED EMBODIMENTS

Figure 9A:
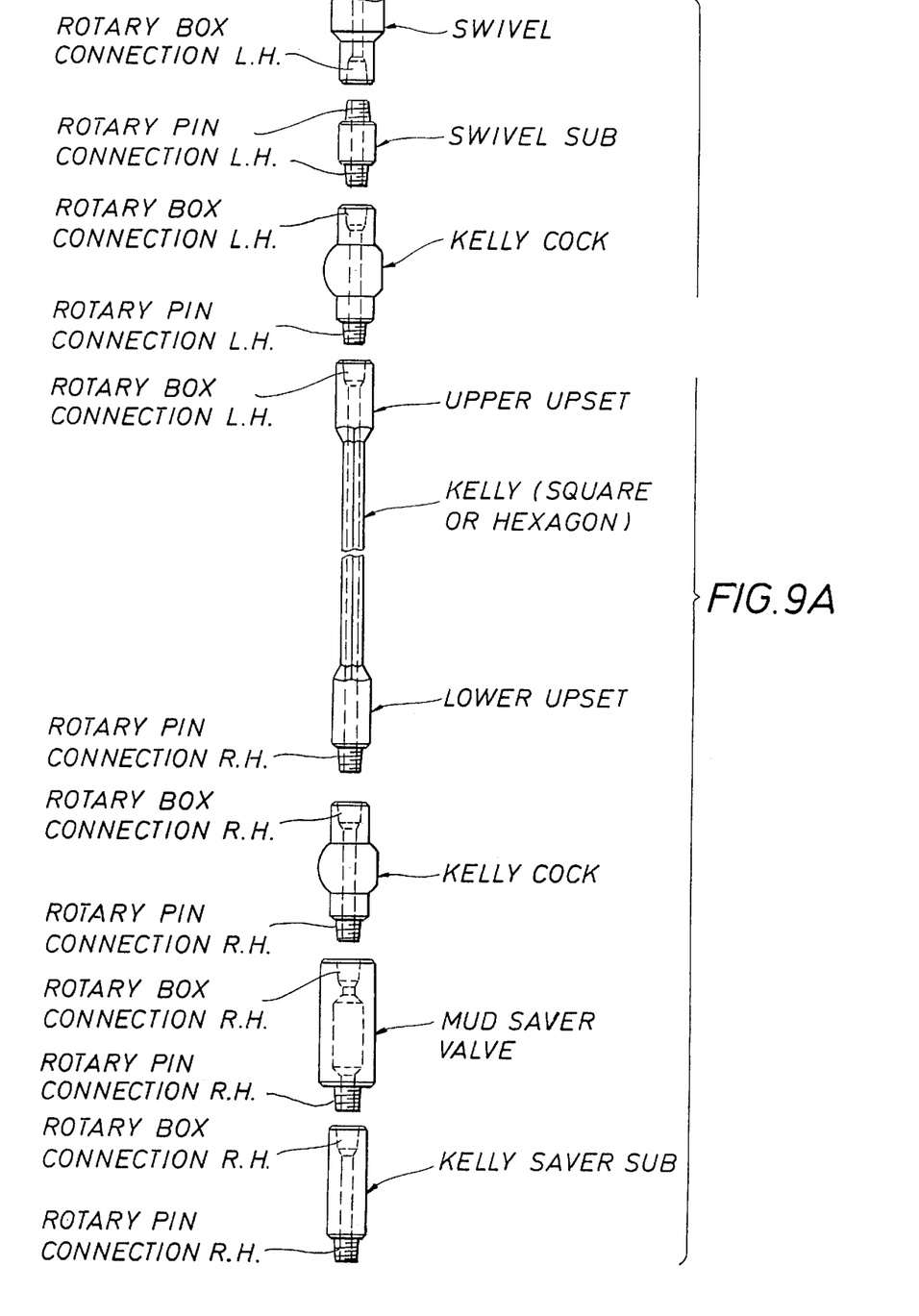
FIGS. 9A and 9B illustrate a typical drill stem assembly including a kelly.
Figure 9B:
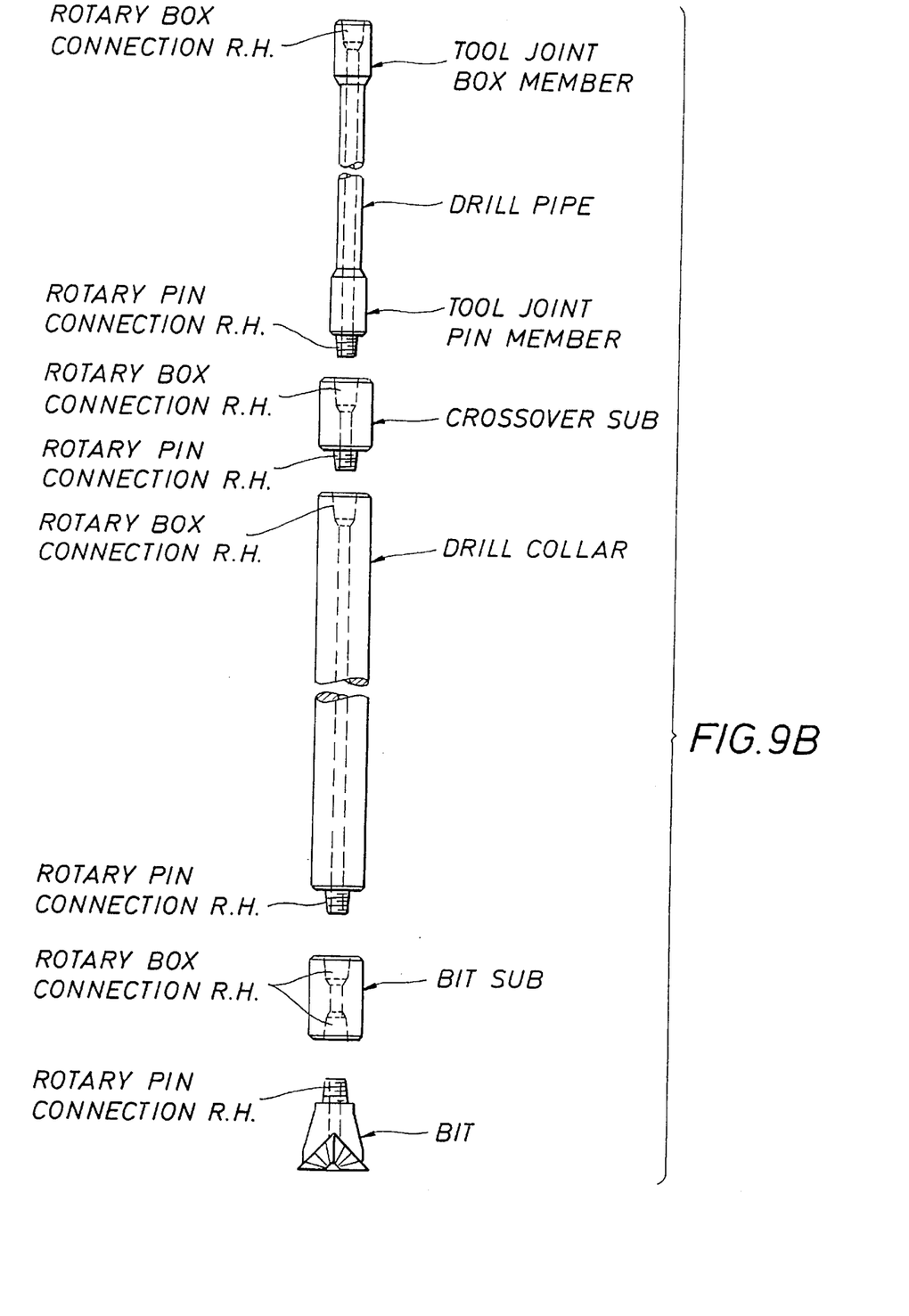

A better understanding of the present invention can be obtained from the detailed description of exemplary embodiments set forth below, to be considered in conjunction with the attached drawings, in which:

FIG. 9 illustrates a typical drill stem assembly. At the top is a swivel having a rotary box connection. A swivel sub attaches to a kelly cock or kelly. Kelly's typically have square or hexagonal sides. The kelly attaches at its lower end to a kelly cock or kelly saver sub. The mud saver valve of the instant invention would attach between the kelly cock and kelly saver sub.

Below the mud saver valve or kelly saver sub stems of pipe connected by joints are run. Any number of pipe joints may be in the drill string, depending upon the depth of the well. Below the pipe joints a cross over sub connects to a drill collar. The drill collar connects to a bit sub and the bit.

The drill string is rotated by means of rotating the square or hexagonally sided kelly. The kelly is rotated by means of a rotary table or a power swivel. Drilling fluid or mud is pumped down the kelly, drill pipe and collar to the bit. The mud exits the bit and is flushed up the annulus of the hole carrying with it cuttings from the drilling. A high pressure source of drilling fluid or mud connects with the swivel to pump the mud down at high pressure through the drill stem assembly to the bit and back up the annulus to the surface.

As the bit progresses additional joints of drill pipe will be added to the drill stem assembly. At such time the kelly and kelly cock or saver sub are disconnected from the drill pipe while the additional length of pipe is made up. The mud saver valve of the instant invention would remain with the kelly and kelly sub. Upon ceasing the pumping of mud, usually pumped at pressures in excess of 1000 psi, the valve of the instant invention would close due to the decrease of positive differential pressure across its tube diaphragm or sleeve. With the instant mud saver valve when the valve closes, the mud in the kelly is not lost.

Figure 1:
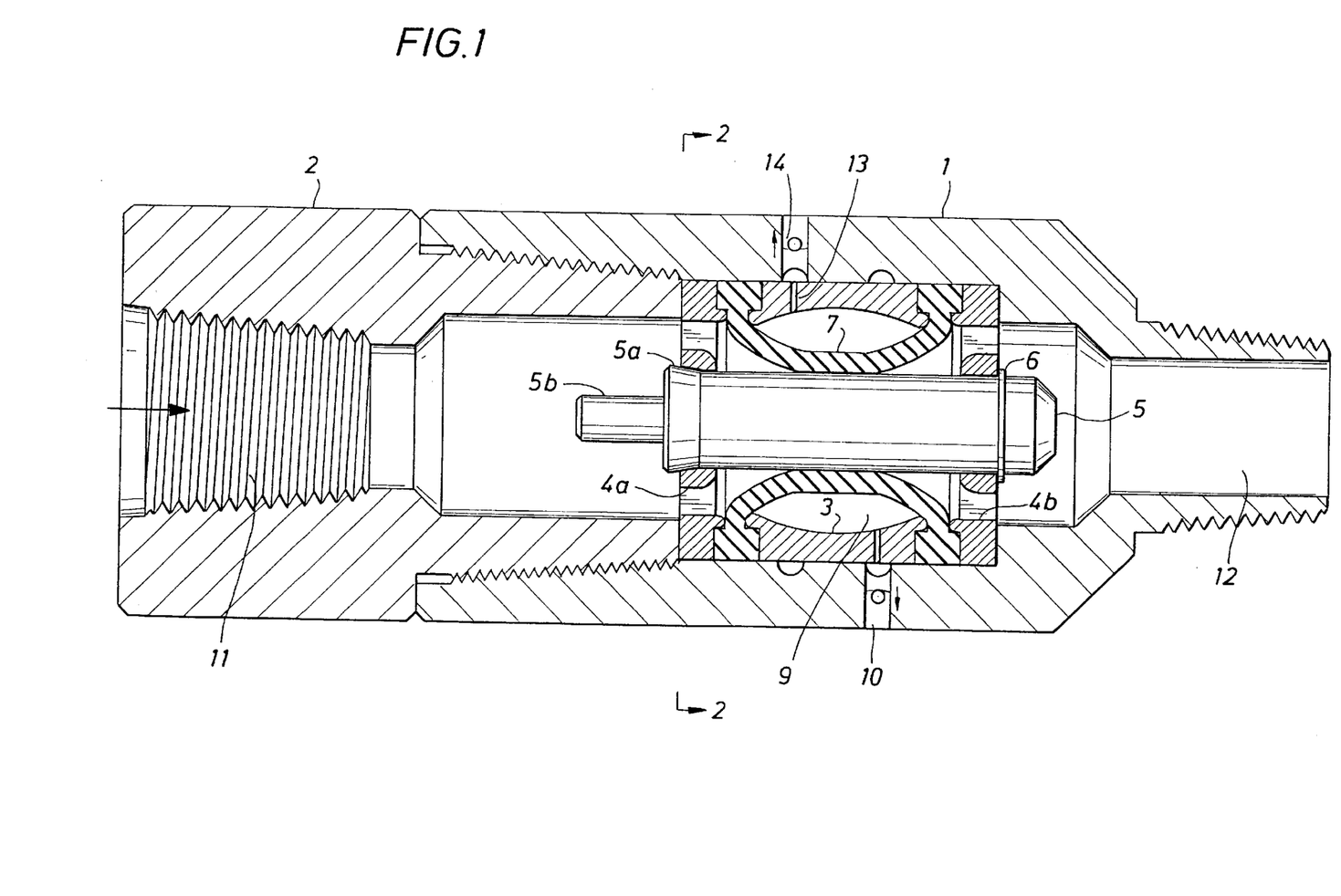
FIG. 1 illustrates a longitudinal cross-section of a preferred embodiment of the present invention.

Preferred embodiments of the present invention, illustrated by the embodiment of FIG. 1, would be approximately 28 to 30 inches in length. The valve outside diameter (OD) would preferably be under 9½ inches, in order to pass relatively easily through a rotary table. A rotary table might have a 10½ inch maximum clearance.

As illustrated in FIG. 1 a preferred embodiment of the present invention comprises two housing sections, outlet section 1 and inlet section 2. The valve may be assembled by inserting elements 3 through 7 of FIG. 1 into a cavity provided within outlet section 1. The inserted elements are then held in place by screwing inlet section 2 into outlet section 1, as illustrated in FIG. 1. Flow, in the figures, is illustrated as preceding from left to right.

The valve of FIG. 1 includes a tube diaphragm or sleeve 7 held in place between retainer 3 and barrier or core retainers 4A and 4B. Removable barrier or core 5 is held in place in the flow passageway defined in the housing and within sleeve 7 by means of barrier retainers 4A and 4B. A flared upstream end 5A on barrier or core 5 keeps the barrier or core from being pressured through retainer 4A which is also tapered. FIG. 1 illustrates core 5 also being held against retainer 4 in the downstream portion of the valve by means of a barrier retainer ring or pin 6. Stem end 5B of core 5 provides an easy grasp for a fishing tool to attach and pull barrier 5 up through the kelly, if and when necessary. Barrier 5 is pulled up through the kelly by means of breaking barrier retainer ring or pin 6. A force of 500 lbs. might be set as the breaking force for ring or pin 6. Such removal of core 5 would be desirable if it were important to insert a fishing tool through the kelly. When the core is so removed it should be replaced before drilling recommences. Replacing the core is accomplished by detaching the valve housing sections.

If the mud saver valve were above the surface and free, core 5 would not be needed to be forcibly removed from the valve. Rather, the valve could be unscrewed from the end of the kelly. However, it is possible with a rotary table that the need to insert a fishing or wire line tool could exist, while the mud saver valve is below the surface due, to the progression of the kelly with the drill string.

Figure 1A:
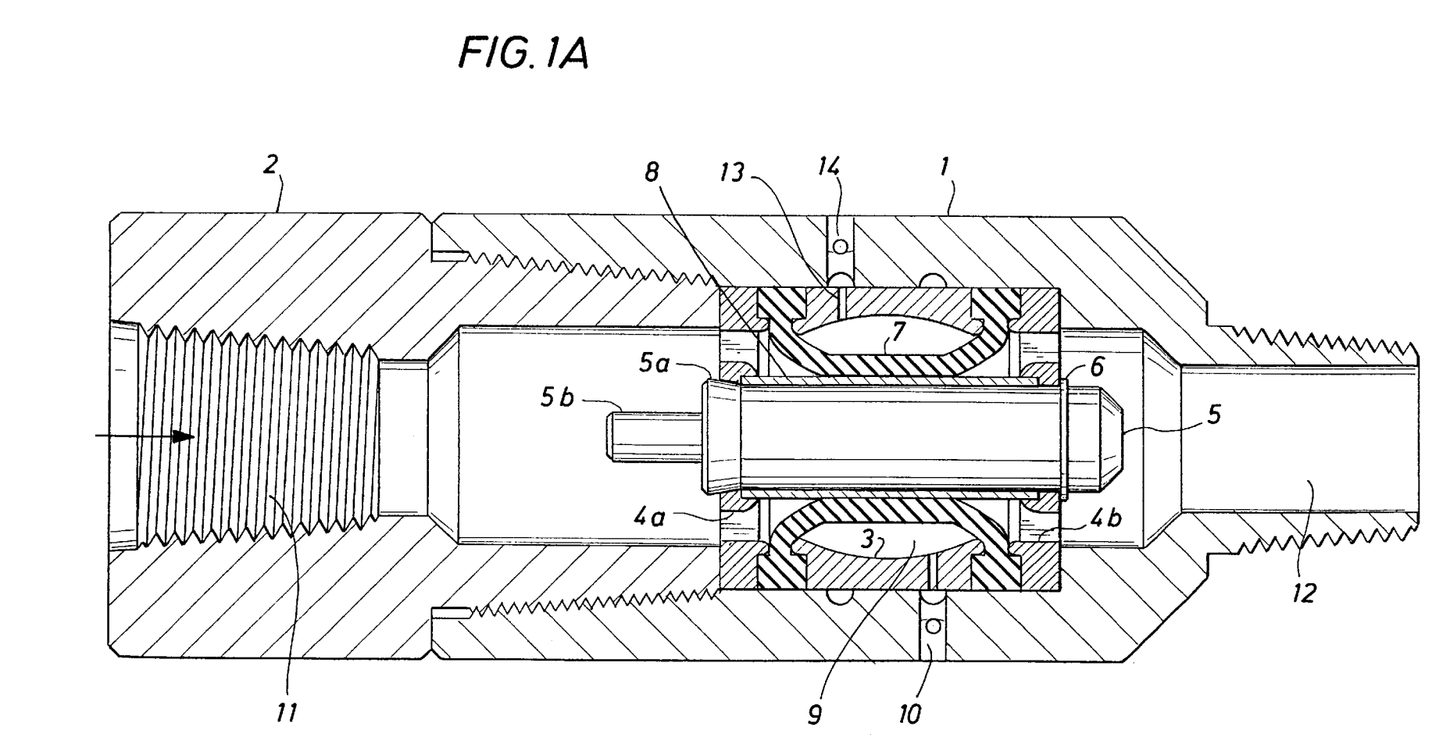
FIG. 1A illustrates a longitudinal cross-section of further embodiment of the present invention.
Figure 1B:
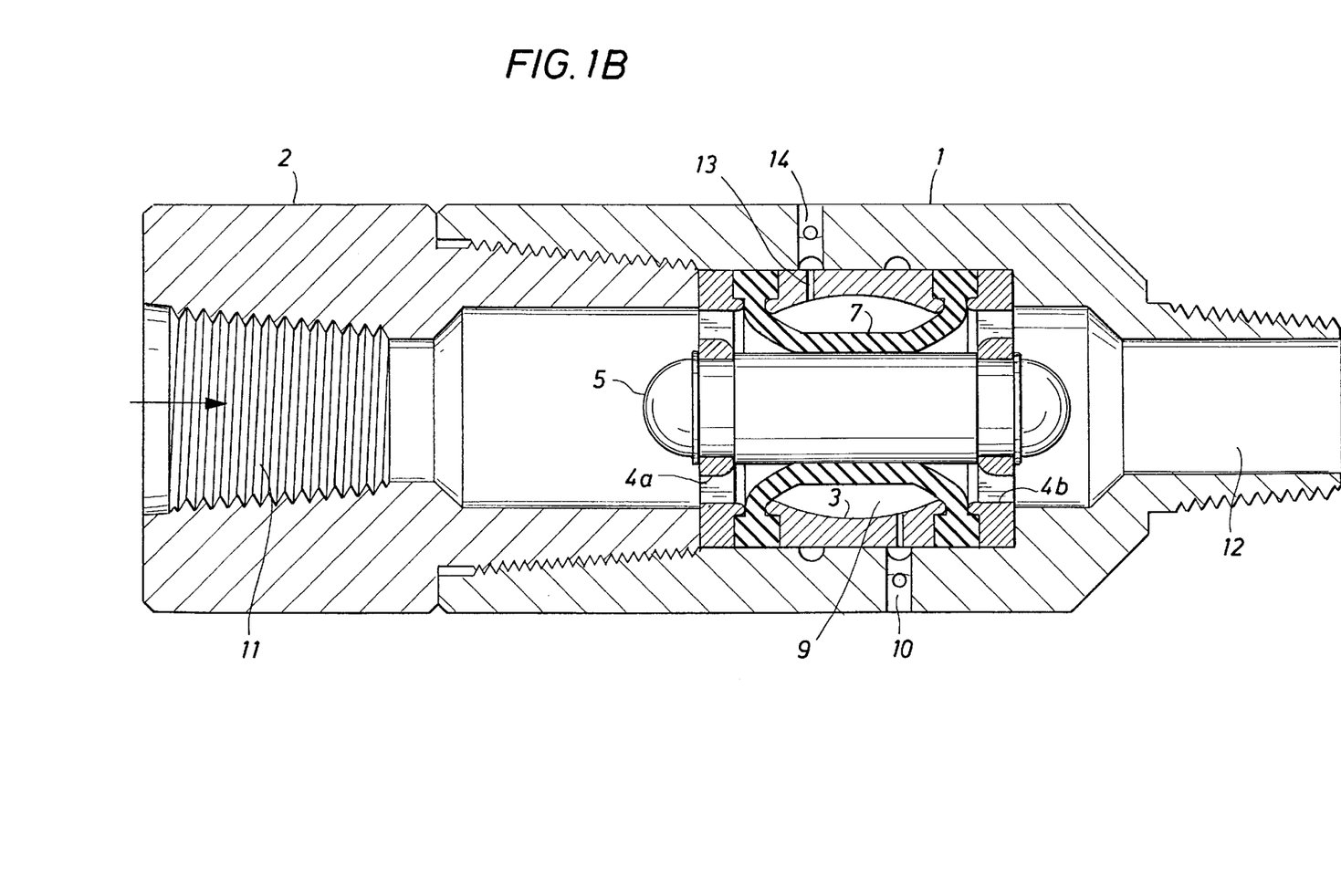
FIG. 1B illustrates a longitudinal cross-section of further embodiment of the present invention.

If the kelly is powered by a power swivel from above, a fixed barrier or core 5, as in FIG. 1B can be used, as the mud saver valve should be always accessible. In such case there would be no need to insert wire line or fishing tools through the mud saver valve, as the whole valve could be removed.

FIG. 1A illustrates an alternate embodiment of the valve of FIG. 1. In FIG. 1A a fixed cylinder or sleeve 8 is illustrated surrounding removable core 5. Cylinder or sleeve 8 remains retained in retainer 4 after core 5 is forcibly removed. In the case of the valve of FIG. 1A, the sleeve seals against exterior cylinder 8, considered for these purposes as part of core 5.

Figure 2:
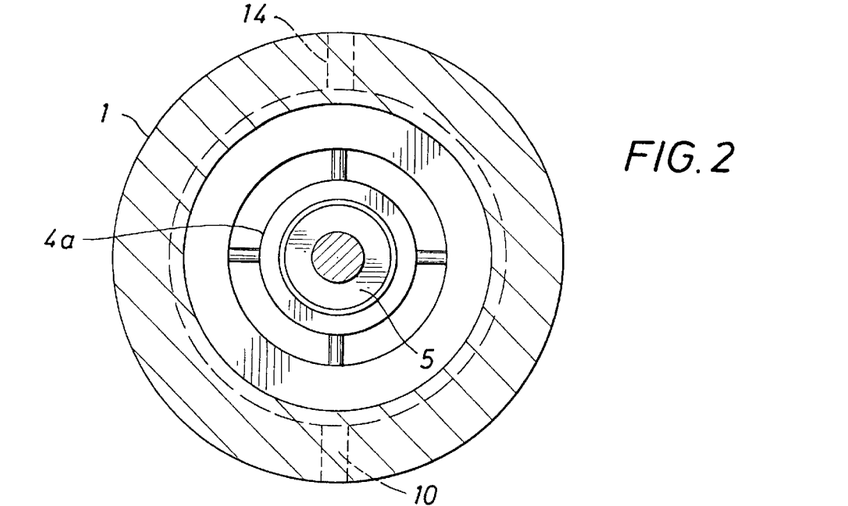
FIG. 2 illustrates a radial cross-section of the valve of FIG. 1.

FIG. 2 illustrates in cross section the relationship of retainer 4 in conjunction with barrier or core 5 and the outlet section 1 of the housing of the valve.

Figure 3:
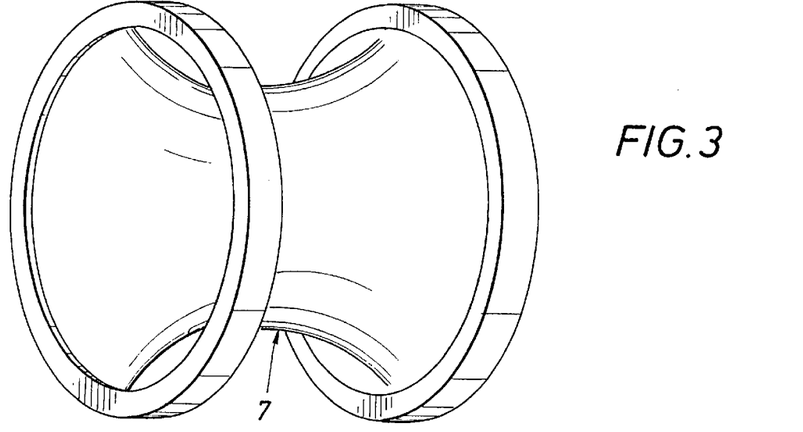
FIG. 3 offers a prospective view of a sleeve or tube diaphragm suitable for use in the valve of FIG. 1.
Figure 4:
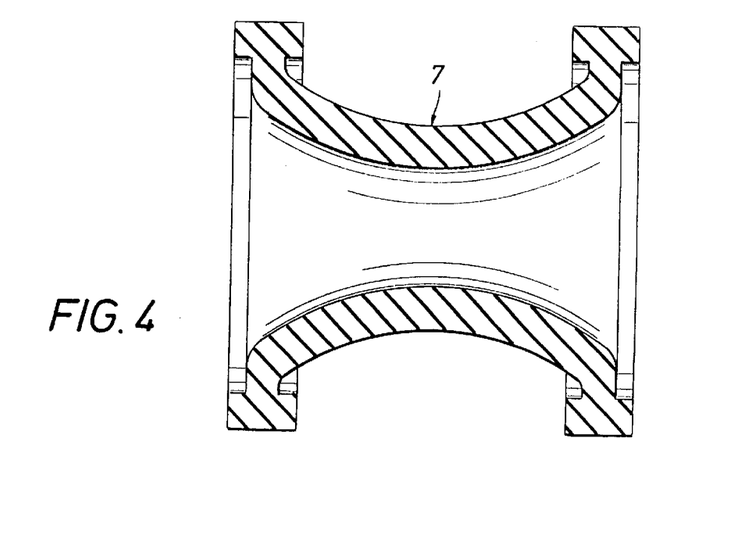
FIG. 4 offers a longitudinal cross-section view of the tube diaphragm of FIG. 3.

FIGS. 3 and 4 illustrate tube diaphragm or sleeve 7. Tube diaphragm or sleeve 7 is preferably structured of hydrogenated nitrile rubber. The thickness of the sleeve is anticipated to run approximately it, or slightly below. Given the design, structure, material and thickness of the sleeve, the sleeve is formed in conjunction with core 5 such that the sleeve seals against core 5 and seals flow passageway 11 and 12 at low positive differential pressure, or at least at pressures below approximately 100 psi. Of course, it seals in the absence of positive differential pressure as well. Positive differential pressure refers to pressure from the inside of the sleeve tending to move the sleeve outward or to expand. Chamber 9 as illustrated in FIG. 1 provides an expansion chamber in which sleeve 7 can recede in the open position.

At a given positive high differential pressure sleeve or tube diaphragm 7 will move away from sealing contact with core 5 (and/or sleeve 8, considered part of core 5). The sleeve will move into chamber 9, opening the flow passageway from inlet passage 11 through to outlet passage 12. As long as the differential pressure on the tube diaphragm or sleeve 7 is maintained above the opening threshold pressure value, which is preferably 150 to 200 psi, the sleeve or tube diaphragm will open the flow passage in the valve from chamber 11 to chamber 12. If the positive differential pressure across sleeve 7 decreases below the opening value, the sleeve will close to seal against core 5 and/or core 5 plus sleeve 8.

Figure 5:
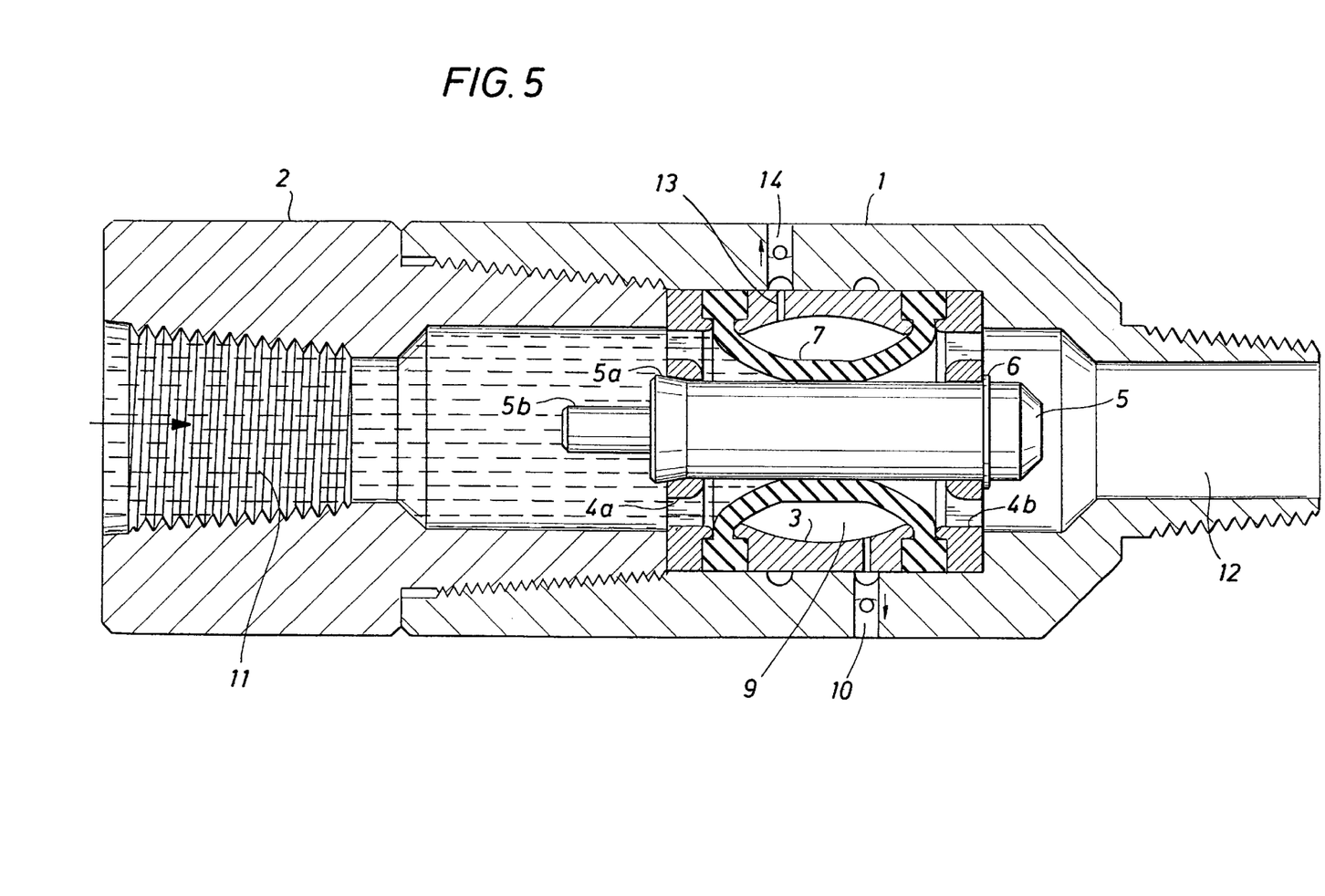
FIG. 5 illustrates the valve of FIG. 1 when closed.
Figure 6:
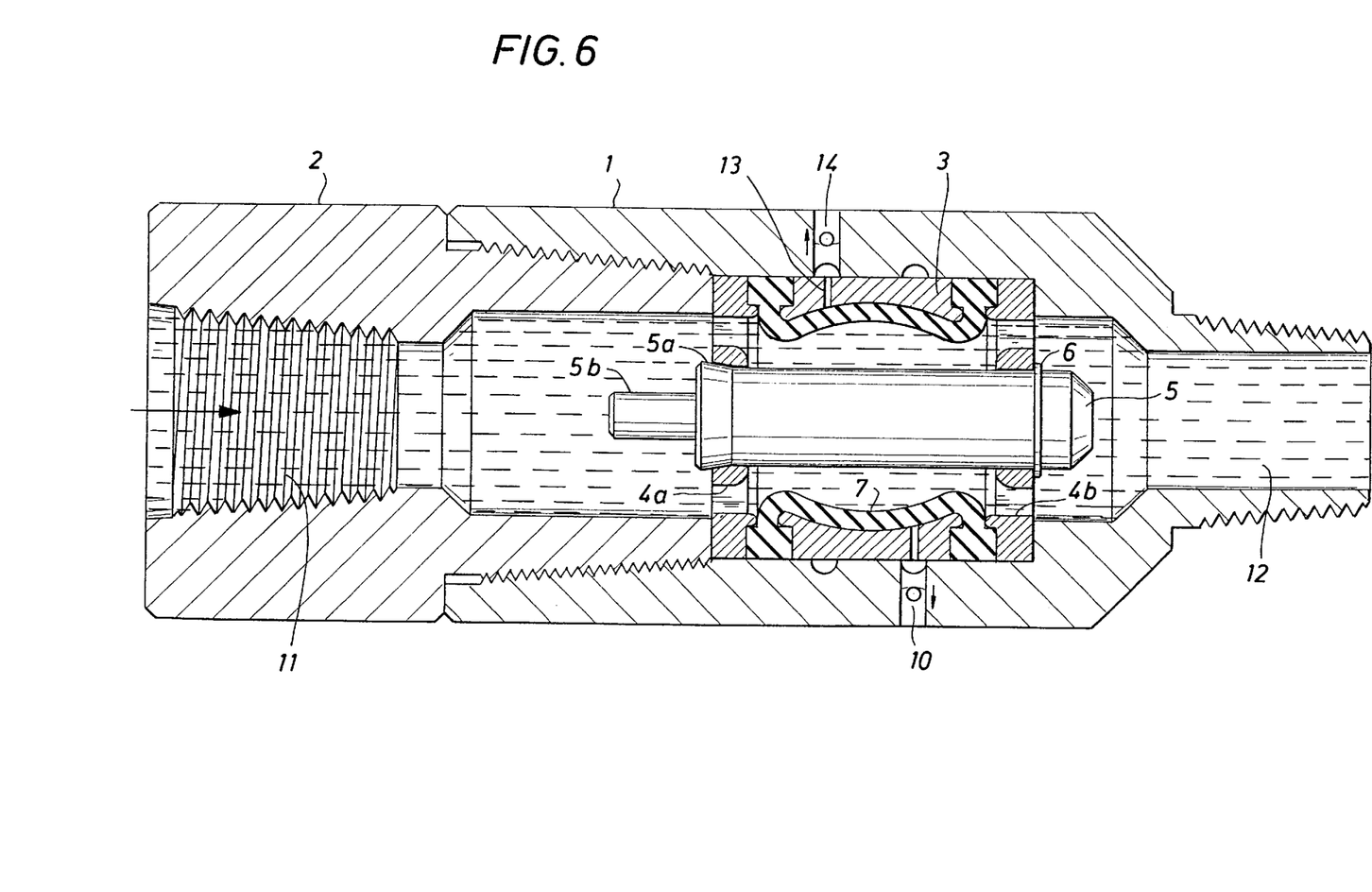
FIG. 6 illustrates the valve of FIG. 1 when open.
Figure 7:
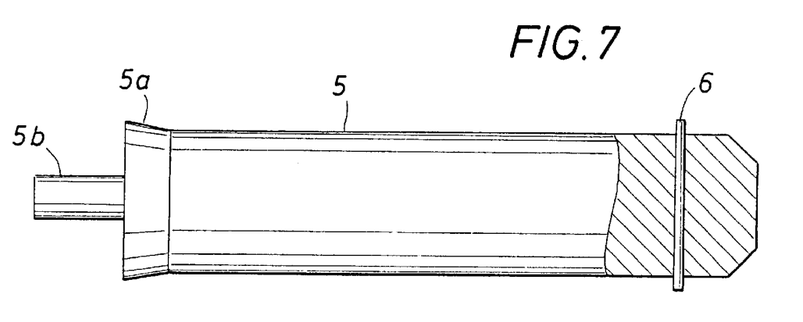
FIG. 7 offers a cross-sectional view of a removable barrier or core, applicable to the valve of FIG. 1 and 1A.
Figure 8A:
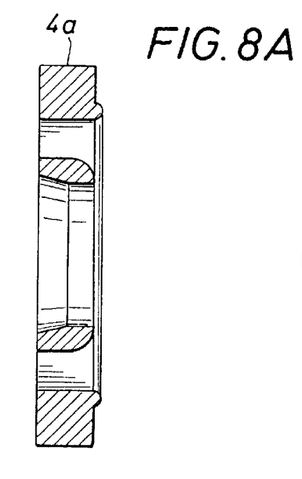
FIGS. 8A, 8B, 8C and 8D offer a cross-sectional view of the core retainer for the valve of FIG. 1.
Figure 8B:
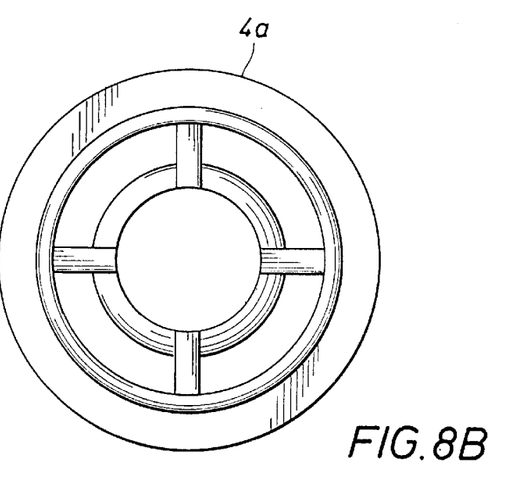
Figure 8C:
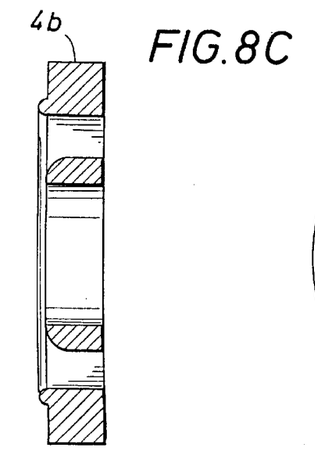
Figure 8D:
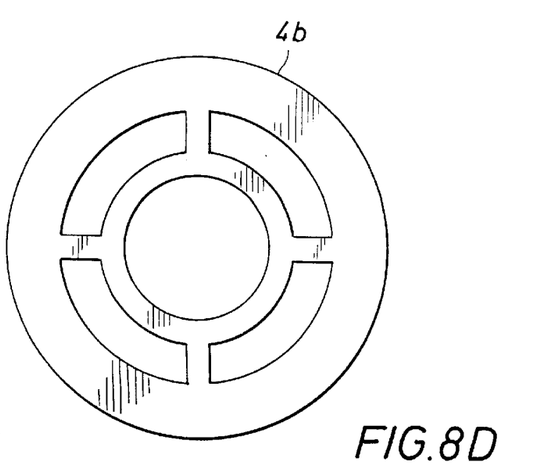

FIG. 5 illustrates the mud saver valve, closed, where the positive differential pressure is low or below the value necessary to open the valve by moving sleeve 7 outward into chamber 9. FIG. 6 illustrates the mud saver valve open when the positive differential pressure across the walls of sleeve 7 is sufficient to open the valve and allow flow from inlet chamber 11 through the flow passage and out outlet chamber 12.

In operation it is anticipated that the opening differential pressure would be fixed somewhere between 150 psi to 200 psi, perhaps at 200 psi. An important consideration is to set the opening differential pressure above the highest anticipated head pressure from mud retained in the kelly. Mud pumps typically generate pressures above 1000 psi.

FIG. 1 illustrates ports 13 leading from chamber 9 through sleeve retainer 3. FIG. 1 also illustrates ports 10 communicating between the exterior and the interior of housing section 1. one role of tester ports 13 is to indicate the presence of a rip or tear in diaphragm 7. Further, ports 13 and 10 can permit any fluid trapped or captured in chamber 9 to be more easily expelled to facilitate opening the valve. Optionally, check valves 14 could be utilized to control flow such that fluid flows easily out of chamber 9 but not easily into chamber 9 from the exterior of the valve.

The foregoing disclosure and description of the invention are illustrative and explanatory thereof, and various changes in the size, shape, materials, as well as in the details of the illustrated system may be made without departing from the spirit of the invention.

What is claimed is:

1. A mud saver valve, comprising:
   a housing adapted to be connected to a kelly;
   an elastomeric sleeve within the housing defining a flow passage therethrough, the sleeve being exposed to an exterior pressure and to an interior pressure;
   a core located within the flow passage; and wherein
   at least one of the sleeve and the core are biased and structured in such a manner as to seal against each other to maintain the flow passage closed for a range of positive differential pressure values, where the interior pressure exceeds the exterior pressure, up to a value of at least approximately 100 psi, and only to unseal to open the flow passage at higher positive differential pressure values.

2. The valve of claim 1 wherein the housing is dimensioned to pass through a rotary table.

3. The valve of claim 1 wherein the housing has an OD of less than 10 inches.

4. The valve of claim 1 wherein the sleeve and core are structured in combination to seal the flow passage against positive differential pressure values where the exterior pressure is defined by ambient fluid pressure.

5. The valve of claim 1 wherein the higher positive differential pressure values lie above the value of the maximum head pressure expected from drilling fluid contained in the kelly.

6. The value of claim 1 wherein the higher positive differential pressure values begin within the range of 150–200 psi.

7. The valve of claim 1 wherein a chamber is defined between portions of the housing and the sleeve.

8. The valve of claim 7 wherein the chamber is in fluid communication with an exterior portion of the housing.

9. The valve of claim 8 wherein a check valve controls fluid communication between the chamber and the exterior portion of the housing.

10. The valve of claim 1 wherein the core is removeably located within the passage.

11. The valve of claim 1 including means for releasably retaining the core within the passage.

12. A method for saving mud while drilling, comprising:
    attaching a valve between a kelly and a drill string, the valve defining a flow passage between a sleeve and a core the sleeve exposed to an interior pressure and to an exterior pressure;
    maintaining the flow passage closed at positive differential pressures when the interior pressure exceeds the exterior pressure by at least up to approximately 100 psi due to a biasing structural design between sleeve and the core;
    opening the flow passage at positive differential pressures, where the interior pressure exceeds the exterior pressure across the sleeve, at an opening value that is greater than a expected hydrostatic head pressure from drilling fluid in the kelly; and
    closing the valve when differential pressure across the sleeve declines below the opening value while the differential pressure remains positive.

* * * * *

UNITED STATES PATENT AND TRADEMARK OFFICE
CERTIFICATE OF CORRECTION

PATENT NO. : 6,053,191
DATED : April 25, 2000
INVENTOR(S) : James J. Hussey

It is certified that error appears in the above-identified patent and that said Letters Patent is hereby corrected as shown below:

| | |
|---|---|
| Column 1, line 44: | change "of" to --Of--. |
| Column 3, line 65: | change "1-1/2" to --1/4--. |
| Column 4, line 53: | change "it" to --3/4"--. |
| Column 5, line 27: | change "one" to --One--. |
| Column 6, line 17: | change "value" to --valve--. |
| Column 6, line 34: | after "core" insert a comma. |
| Column 6, line 39: | before "sleeve" insert --the--. |
| Column 6, line 44: | before "expected" insert --maximum--. |

Signed and Sealed this

Sixth Day of March, 2001

*Attest:*

NICHOLAS P. GODICI

*Attesting Officer*     *Acting Director of the United States Patent and Trademark Office*